United States Patent [19]

Stenkvist

[11] 4,277,638
[45] Jul. 7, 1981

[54] PREFABRICATED UNIT FOR A DC ARC FURNACE

[75] Inventor: Sven-Einar Stenkvist, Vesteras, Sweden

[73] Assignee: ASEA Aktiebolag, Vesteras, Sweden

[21] Appl. No.: 107,764

[22] Filed: Dec. 28, 1979

[30] Foreign Application Priority Data

Dec. 29, 1978 [SE] Sweden ............................. 7813408

[51] Int. Cl.³ .......................... F27D 1/00; H05B 7/00
[52] U.S. Cl. .................................................. 13/35
[58] Field of Search .......................... 13/9 R, 35, 12

[56] References Cited

U.S. PATENT DOCUMENTS

| | | | |
|---|---|---|---|
| 1,304,350 | 5/1919 | Moore | 13/35 X |
| 1,763,248 | 6/1930 | Moore | 13/35 X |
| 1,965,080 | 7/1934 | Kemmer | 13/35 X |
| 2,528,905 | 11/1950 | Ollivier et al. | 13/35 X |

Primary Examiner—Roy N. Envall, Jr.
Attorney, Agent, or Firm—Kenyon & Kenyon

[57] ABSTRACT

A prefabricated unit for a DC arc furnace having a hearth bottom comprising electrically conductive bricks is formed by a metal plate having a cluster of depending metal rods and an electrically non-conductive refractory compound rammed or cast around the rods and the bottom of the plate with the bottom ends of the bars exposed below the compound. The unit is adapted to be installed on the bricks with the bars' bottom ends in electrical connection with the bricks so as to form an electrically conductive hearth for the furnace.

4 Claims, 2 Drawing Figures

PREFABRICATED UNIT FOR A DC ARC FURNACE

BACKGROUND OF THE INVENTION

This applicant's pending application Ser. No. 15,587, filed Feb. 27, 1979, discloses a DC arc furnace hearth formed by a layer of carbon bricks above which an electrically relatively non-conductive refractory compound is rammed to contain a melt, and metal bars or rods inserted through the compound so that their upper ends are exposed to the melt and their bottom ends are in electrical connection with the bricks, forming an electrically conductive hearth. An arcing electrode above the melt can be connected to one pole of DC power and the hearth connected to the other so that an arc is formed between the electrode and melt.

The rammed compound can be of the usual type which while moist or soft is rammed onto the bricks of the conventional electric arc furnace hearth. While it is still soft, the metal bars or rods can be driven down through this compound so that the bars' upper ends are exposed to the melt and their bottom ends are in electrical connection with the electrically conductive bricks. Preferably a layer of electrically conductive soft material, such as a graphite layer, is first layed on the bricks so this layer is beneath the rammed compound for penetration by the rods and the establishment of a better electrical connection. For a power connection a metal plate is positioned below and in electrical contact with the conductive bricks.

The above installation technique is complicated, runs the risk that the rods, which should be arranged as a cluster of uniformly interspaced bars, may be inaccurately positioned, and in general, the making of such a furnace hearth, although entirely practical, can be troublesome.

Furthermore, before the furnace can be started up, the moist rammed non-conductive refractory must be dried and fired just as is the case when lining or relining the usual hearth of any electric arc furnace.

The hearth described has the practical advantages that it provides an electrically conductive hearth forming a hearth connection for carrying the DC current into the melt as required to form the arc with the usual arcing electrode connected with opposite polarity to the power source, normally so that the arcing electrode operates cathodically. This eliminates the need for the usual side positioned melt electrode or connection with its attendant disadvantages and may eliminate the need for the usual starting electrode conventionally required to melt down scrap to a degree making the conventional hearth electrode effective during start-up of the furnace.

When the furnace is in operation, the upper ends of the metal bars exposed at the top level of the rammed refractory and in contact with the melt, themselves melt downwardly through the rammed compound to a limited extent, but since the bars can be made of the same metal as the melt in the hearth, usually steel, the melt does not necessarily become appreciably altered in its composition.

The object of the present invention is to enjoy the advantages of the described kind of electrically conductive hearth while avoiding its installation disadvantages.

SUMMARY OF THE INVENTION

According to the present invention, the DC arc furnace is made as above described to the extent that its bottom is layed up with the electrically conductive bricks, such as carbon bricks or bricks comprising a considerable amount of graphite, for example, and preferably with the layer of graphite or other conductive material penetrable by the bottom ends of the bars or rods, layed on these bricks.

The difference is that to complete the conductive furnace hearth a prefabricated unit is provided. This unit comprises a horizontal metal plate of oblong, square or other contour and to which the top ends of the cluster of metal rods are welded to form the desired pattern, with these rods depending from the plate, the electrically non-conductive refractory compound being rammed around these rods and the bottom of the plate with the bottom ends of the bars exposed below the compound. This unit is completely made before being installed in the furnace. The refractory compound can be rammed or cast around the rods in a suitable mold so that the result is a slab or block and normally the rammed or cast moist refractory is dried and fired prior to installation so that the unit is ready for use. The metal parts are usually made of steel and the refractory compound can be the usual non-conductive compound used to line the brickwork of the conventional electric arc furnace.

The plate can be curved to conform with the usual hearth shape and it can be provided with metal eye bolts or the like so that it can be lifted and lowered by a crane.

This new unit can be completely finished before installation and, with the arc furnace roof removed, it can be lowered by a crane onto the electrically conductive bricks forming the hearth bottom, or the soft penetrable conductive layer, preferably on top of the electrically conductive bricks. With small furnaces only one unit may be required while a multiplicity of appropriately contoured and interfitting units may be used in the case of larger furnaces.

Assuming a steel melting furnace, the plate or plates of the units which would then be made of steel, initially form what is, in effect, a steel hearth for the furnace, this giving excellent contact with scrap charged on the hearth, eliminating the need for a starting electrode. With power on the metal plate below the conductive bricks, current is transmitted through the latter, the conductive soft layer preferably on top of the bricks and via the rods whose lower ends can penetrate this soft conductive layer, or contact the bricks if the layer is not used, to the steel plate of the unit. The rods themselves in this case would be made of steel. As the scrap melts, the steel plate or plates, and steel eye bolts, if used, leave the steel rods to function as before, but in this case positively accurately interspaced in their designed cluster pattern. The easier installation achieved by the use of this new unit or units is believed to be clearly understandable.

To assure maximum possible electrical conductivity, the exposed bottom ends of the rods of the new unit are provided with electrically connected, preferably welded, metal flanges each having a multiplicity of metal spikes or pointed projections which depend from the flanges for more positive electrical connection with the electrically conductive bricks or more extensive penetration of the conductive soft layer when it is used.

The principles of this invention are illustrated by the accompanying drawings:

BRIEF DESCRIPTION OF THE DRAWINGS

These accompanying drawings to some extent schematically illustrate the new principles, FIG. 1 being a vertical elevation showing a DC electric arc furnace having a hearth exemplifying the principles of applicant's application Ser. No. 15,587, while

DETAILED DESCRIPTION OF THE INVENTION

Figure 1:
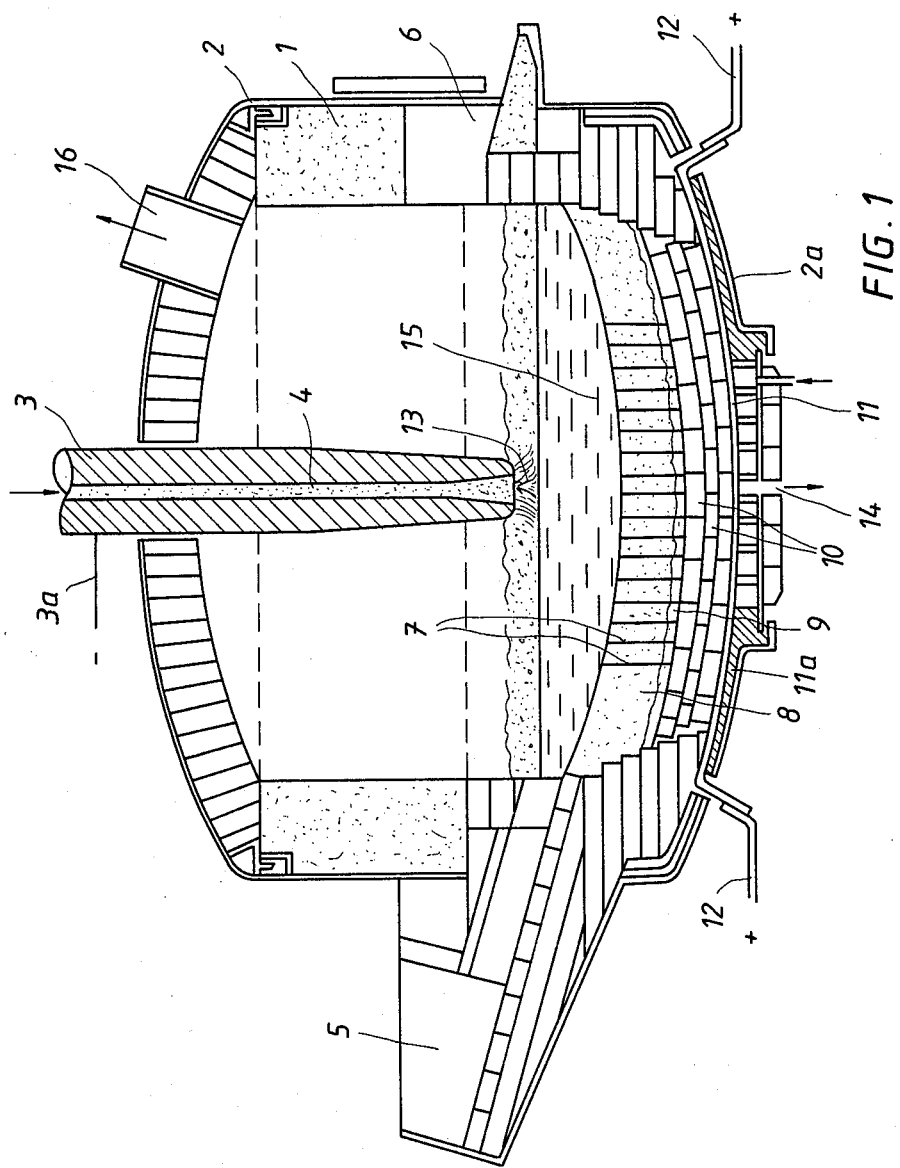

The illustrated furnace is of the type used for the melt reduction of iron oxides, usually in the form of powdered iron ore, possibly prereduced to some extent, and which is fed through a tubular arcing electrode into a carbonaceous iron melt so that a reaction occurs between the oxides and the carbon reducing the oxides to molten iron. The melt continuously increases in volume and is from time to time tapped as required. The furnace can operate continuously until it must be shut down for repairs to either the lining or the hearth. The electrode used is consumable, such as by being either carbon, graphite or of the Soderberg type, and is tubular in the sense that it has an axially extending feeding passage for the powdered material, and is preferably operated so that the melt is anodic and the electrode is cathodic. Alternatively the furnace may be used for scrap melting.

With the above introduction, the furnace may have the usual side wall lining 1 and is enclosed by the customary steel shell 2 with the tubular electrode 3 depending through an opening in the furnace roof, the feeding passage being shown at 4 extending axially through the electrode. Although the details are not shown, it is assumed to be of the usual rocking type, the melt pouring spout being indicated at 5 and the deslagging port at 6.

The cluster of steel bars 7 extending through the rammed compound 8 are shown as extending throughout an area almost as large as the interior of the furnace. Although no plan view is shown, it is to be understood that the cluster of bars 7 is circular in contour and, as is indicated by the drawing, are symmetrically arranged around the axis of the electrode 3. The layer of graphite forming the soft conductive layer is shown at 9 above the carbon bricks 10 which are, in turn, supported by the steel or copper contactor plate 11 extending for the entire extent of the furnace bottom, this plate, in turn, being supported by the bottom 2a of the shell 2 via appropriate insulation indicated at 11a. The shell bottom 2a can be made centrally opened to provide clearance for a water-cooling assembly 14 fixed to the central portion of the bottom of the plate 11, and with other openings through which downwardly bent ends of the plate 11 extend to form connectors with the external power source, as indicated at 12. These would be positive connections, the negative connection of the electrode 3 being schematically indicated at 3a.

In the drawing the vertically directed arc 13 is indicated as being formed between the tip of the electrode 3 and the melt 15 in the hearth. The reaction between the oxides and carbon produces gas which can be withdrawn via the outlet 15 in the furnace roof.

The bars 7 would in this instance be made of iron or steel or, in other words, compatible with the carbonaceous iron melt 15. The rammed material 8 through which the rods 7 are driven, preferably while the material 8 is still plastic and before its hardening, may be any of the well-known hearth compounds rammed to form a hearth bottom. The rammed compound may be any of the usual ground quartzite, dolomite or aluminum or magnesium oxide. The bricks 10 must be electrically conductive in the sense that they have adequate conductivity and refractory characteristics to permit their use as a large conductive bed protected against the melt 15 by the layer of rammed compound 8. The graphite layer 9 might be substituted by any other refractory material that is adequately conductive, but at the present state of the art uncompacted graphite is indicated. The steel or copper plate 11 also should be designed to carry the arcing current and preferably it should extend throughout the entire hearth bottom. It is not required to have great structural strength because it is supported via the electrical insulation 11a by the furnace shell bottom 2a. The water cooling assembly 14 may be of any design and may, in some instances, not be necessary, although its use is considered preferable.

The rammed material is considered to be electrically non-conductive in the sense that even when hot it is inherently incapable of conducting the arcing current required by the furnace. The bars or rods, graphite layer, carbon bricks and metal conductor plate are all considered to be electrically conductive in the sense that they can, with the bars or rods acting in parallel, carry the electric current required by the arc.

Throughout the foregoing, it is to be understood that as usual the arcing electrode or electrodes are arranged centrally with respect to the furnace and its hearth, and that the furnace and hearth in the conventional manner have a generally circular contour in the horizontal direction. The arcing electrode or electrode's tip or tips are, therefore, positioned substantially centrally above the hearth and are, of course, adapted to form an arc with the melt.

Figure 2:
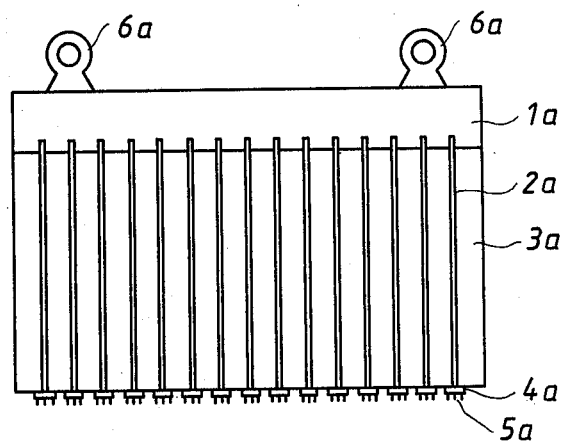
FIG. 2 is a side view schematically showing the new unit of the present invention.

The difference of the present invention over the foregoing is that the unit of FIG. 2 is used to make up the hearth.

The metal plate 1a is shown with the metal or steel rods 2a depending from it and electrically connected to it as by welding. The rods 2a are arranged in their designed cluster pattern and interspacing and the electrically non-conductive rammed compound is shown at 3a. Although the plate 1a is shown as being flat, it is to be understood that it would be contoured as required to fit a curved hearth design, with the bars 2a being vertically positioned. Although not illustrated, to make the unit, a mold can be used of the appropriate cavity contour and the material 3a then rammed or cast into position. Although soft enough for ramming, such material is substantially self-sustaining and the unit can, therefore, be dried and fired so that it becomes a rigid unit having the appearance of a concrete block with a metal or steel top plate.

As previously mentioned, the bottom ends of the rods 2 can be provided with metal flanges 4a from the bottoms of which a cluster of small spikes or prongs 5a depend. For ease of manipulation, the top of the plate 1a is provided with lifting eyes 6a for engagement by the hooks of a crane. The plate 1a, bars 2a and lifting eyes 6a should be made of a metal compatible with the melt to be worked in the furnace, which in the case of the FIG. 1 furnace is iron.

The metal parts of the new unit are preferably interconnected by welding or conceivably other connections might be used providing those parts required to carry current are adequately electrically interconnected. The metal parts can be steel because it it compatible with the crude iron of the melt. For start-up, steel scrap would be used in any event.

With this new unit, the furnace shown by FIG. 1 can have its hearth made up quickly, conveniently and accurately. The vertical extent or length of the rods must leave their bottom ends exposed below the dried and fired rammed refractory in which the rods are encased, and the vertical extent of the rammed material must be adequate to meet the requirements of the hearth when it contains a melt and which requirements may, in general, correspond with the rammed hearth lining made up above the brickwork of any arc furnace. Possibly a little greater lining thickness might be used in view of the high heat conductivity of the metal rods built into the new unit.

What is claimed is:

1. A prefabricated unit for a DC arc furnace having a hearth bottom made of electrically conductive bricks, said unit comprising a metal plate, a cluster of metal rods depending from said plate and which are fixed to the plate in electrically conductive connection with the plate, and an electrically non-conductive refractory compound rammed or cast around said rods and the bottom of said plate with the bottom ends of the bars exposed below the compound, said unit being adapted to be installed on said bricks with the bar's said bottom ends in electrical connection with the bricks so as to form an electrically conductive hearth for the furnace.

2. The unit of claim 1 in which said plate has fixed thereto upstanding metal means for manipulating the unit during installation on said bricks.

3. The unit of claim 1 in which a layer of penetrable electrically conductive material is layed on said bricks and metal flanges with depending metal spikes are connected to said bottom end of the bars, said spikes being adapted to penetrate said material.

4. The unit of claims 1, 2 or 3 in which said rammed refractory material is fired and ready for use prior to installation of the unit on said bricks.

* * * * *